Patented Dec. 16, 1952

2,622,038

UNITED STATES PATENT OFFICE 2,622,038

METHOD OF PREVENTING DETERIORATION OF PRINTING ROLLERS

Percy Allan Charlesworth, Adlington, near Macclesfield, and John Craven, Manchester, England No Drawing. Application November 15, 1948, Serial No. 60,164. In Great Britain December 4, 1947

1 Claim. (Cl. 117—2)

This invention relates to ink or colour distributing rollers used in printing machines, hereinafter referred to as printing rollers, and other articles made from plastics, the characteristics of resiliency and tackiness of such roller or article being dependent on its plasticizer content.

One of the causes necessitating the replacement of such printing rollers is a tendency of the material at or adjacent to the surface to lose its original tackiness and resiliency with a resulting deterioration in the roller's ink distributing properties. Moreover there may be a tendency for shrinkage of the roller to occur. As this deterioration proceeds it is accompanied by the appearance of cracks in the surface which may ultimately result in pieces of the roller actually breaking off.

There are a number of reasons for such deterioration but provided the rollers have received adequate care and attention, it can be largely ascribed to a loss of one or more of the ingredients which have been incorporated in the roller compound to impart the required degree of resiliency and tackiness, commonly referred to as plasticizers. The loss of such ingredient or ingredients is due mainly to selective absorption from the roller by the various inks and wiping compounds used on the roller, thereby causing the surface of the roller to harden and lose its tackiness with consequent deterioration in its distributing properties and finally causing embrittlement to occur.

It has been found by research and experiment that this process of deterioration can be slowed up or even obviated depending on the type of roller and its use by using a wiping down compound which contains a sufficient concentration of the appropriate plasticizing agent or agents so that it is incapable of taking up any more from the roller. Moreover if a surface has already undergone a certain amount of embrittlement or deterioration the resiliency and tackiness can in some instances, be restored by treatment with a compound containing an appropriate plasticizing agent or agents.

Methods of applying the plasticizer include spraying, immersing, dipping or wiping down the roller with or in the plasticizer, or in liquid form; spraying, immersing, dipping or wiping down the roller with or in a liquid containing the plasticizer in solution or dispersion; or producing the plasticizer in situ on the surface of the roller. Where the roller is immersed or dipped into the plasticizer or into a suspension or dispersion thereof agitation of the liquid usually accelerates the process of absorption of the ingredients. Again in most cases an increase in temperature of the liquid whether it is sprayed onto the roller or the roller is immersed or dipped therein also accelerates the process of absorption.

The invention is particularly applicable to rollers produced from polyvinyl compounds, such as polyvinyl chloride, polyvinyl acetate, polyvinyl butyral, polyvinyl acetal, or copolymers or mixtures thereof which have been plasticized with one or more of the following plasticizers: tricresyl phosphate, dibutylphthalate, dioctylphthalate, dihexylphthalate or dicaprylphthalate.

The plasticizer employed for restoring the roller would usually be the same as that employed in the production of the roller, e. g. in the case of a roller produced from polyvinyl chloride plasticized with tricresyl phosphate, the latter would be employed as the restoring plasticizer. It is to be understood however that in many cases it is not necessary to employ the same plasticizer as that employed in the production of the roller and that a restoring composition of or containing say tricresyl phosphate could be satisfactorily employed for a roller plasticized with another plasticizer or mixture of plasticizers.

The fact that the same plasticizer as that employed in the production of the roller need not be used for restoring the latter has the great advantage, especially in the case of rollers produced from polyvinyl chloride or other polyvinyl compounds, that a restoring composition containing one or more of the herebefore mentioned plasticizers could be employed for restoring the rollers when the precise plasticizer used in their production is not known.

The following example is given to illustrate the invention:

Example

The surface of a roller manufactured from a plastic based on polyvinyl chloride, having tricresyl phosphate incorporated as an appropriate plasticizer will deteriorate due to loss by absorption by the printing ink of the tricresyl phosphate.

This deterioration is avoided by adding tricresyl phosphate to the usual light mineral oil or other wiping down compositions usually employed for wiping down printing rollers. If found to be desirable other ingredients may be added to the composition.

Although the invention has been described with reference to printing rollers it is applicable also to many other articles formed of plastics whose properties have been modified by incorporation of suitable plasticizers. For example, leather cloth used for replacing leather upholstery for motor car seats tends to crack and crumble from the supporting fabric after a period of use but its elasticity can be preserved and the above faults obviated by the occasional application of a compound containing appropriate plasticizing agent or agents.

We claim:

A method of preventing deterioration of and of restoring the deteriorated surface of a printing roller made from a polyvinyl chloride and containing tricresyl phosphate as a plasticizer, and having resilient and tacky characteristics dependent on the tricresyl phosphate content of the roller, which consists in applying to the surface of such roller a composition comprising the usual light mineral oil usually employed for wiping down printing rollers and containing tricresyl phosphate in a concentration sufficient for absorption by the roller in an amount to at least partially restore said characteristics and to avoid absorption of tricresyl phosphate from the roller.

PERCY ALLAN CHARLESWORTH.
JOHN CRAVEN.

REFERENCES CITED

The following references are of record in the file of this patent:

UNITED STATES PATENTS

| Number | Name | Date |
|---|---|---|
| 1,657,870 | Sherts | Jan. 31, 1928 |
| 1,763,618 | Sebrell | June 10, 1930 |
| 2,168,024 | Ensminger | Aug. 1, 1939 |
| 2,268,674 | Roth | Jan. 6, 1942 |
| 2,312,362 | Sarbach | Mar. 2, 1943 |
| 2,385,920 | Jenkins | Oct. 2, 1945 |